United States Patent [19]

Rocco

[11] 4,108,953
[45] Aug. 22, 1978

[54] FUEL VAPORIZING DEVICE

[76] Inventor: Andrew Rocco, 21207 S. Avalon, Space 194, Carson, Calif. 90745

[21] Appl. No.: 814,194

[22] Filed: Jul. 11, 1977

Related U.S. Application Data

[63] Continuation-in-part of Ser. No. 683,325, Jul. 19, 1976, abandoned.

[51] Int. Cl.$^2$ .................... F02M 23/12; F02M 31/12
[52] U.S. Cl. ................................ 261/142; 48/180 H; 123/122 AA; 123/122 F; 261/145; 261/DIG. 20
[58] Field of Search ............ 123/122 F, 122 AA, 135; 261/142, DIG. 20, 145; 48/180 H, 180 B, 180 A

[56] References Cited

U.S. PATENT DOCUMENTS

| 1,023,402 | 4/1912 | Whiting | 48/180 M |
|---|---|---|---|
| 1,065,580 | 6/1913 | Beucus | 123/122 F |
| 1,320,528 | 11/1819 | Borkes | 123/122 F |
| 1,359,279 | 11/1920 | Sansoucy | 48/180 H |
| 1,637,104 | 7/1927 | Crone | 261/142 |
| 2,001,670 | 5/1935 | Smith | 261/145 |
| 2,066,720 | 1/1937 | Duthoit | 261/145 |
| 2,177,840 | 10/1939 | Roualet | 123/122 F |
| 2,700,722 | 1/1955 | Gurley | 261/142 |
| 2,889,904 | 6/1959 | Martinoli | 261/142 |
| 2,946,575 | 7/1960 | Rohr | 261/DIG. 20 |
| 3,780,714 | 12/1973 | Dillow | 123/122 AA |
| 3,787,037 | 1/1974 | Motooka | 261/142 |
| 3,872,191 | 3/1975 | Walcker | 261/145 |
| 3,938,967 | 2/1976 | Reissmuller | 48/180 B |
| 4,020,812 | 5/1977 | Hayward | 123/141 |

FOREIGN PATENT DOCUMENTS

| 499,893 | 2/1920 | France | 261/145 |
|---|---|---|---|
| 83,743 | 12/1894 | Fed. Rep. of Germany | 123/122 F |
| 839,740 | 4/1952 | Fed. Rep. of Germany | 123/122 F |
| 508,424 | 6/1939 | United Kingdom | 261/142 |

*Primary Examiner*—Tim R. Miles
*Attorney, Agent, or Firm*—Harris, Kern, Wallen & Tinsley

[57] ABSTRACT

A device for completely vaporizing the fuel delivered to an internal combustion engine so as to minimize the emission of air pollutants. The device includes a heat conducting tubular housing, a heat conducting screen within and coaxial with the housing with an annular space between the housing and the screen, a heat conducting helical coil within the annular space and coaxial with the housing and the screen, and means for heating the helical coil, either electrically, or with heated air. In one form, a diffuser within and coaxial with the screen adjacent the inlet of the housing directs a fuel and air mixture outwardly into contact with the screen, helical coil and housing. In another form, a fuel injecting means within and coaxial with the screen adjacent the inlet end of the housing sprays fuel toward the outlet end of the housing and outwardly against the screen. A de-icer tube communicates with the inlet end of the housing for delivering heated air thereto under icing conditions.

8 Claims, 6 Drawing Figures

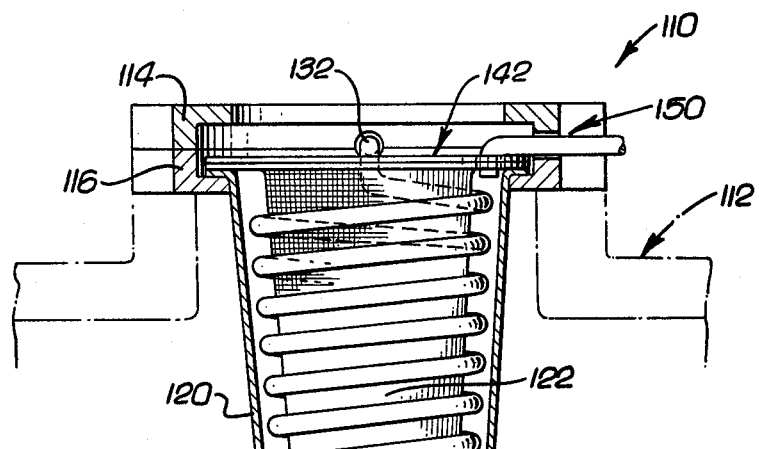
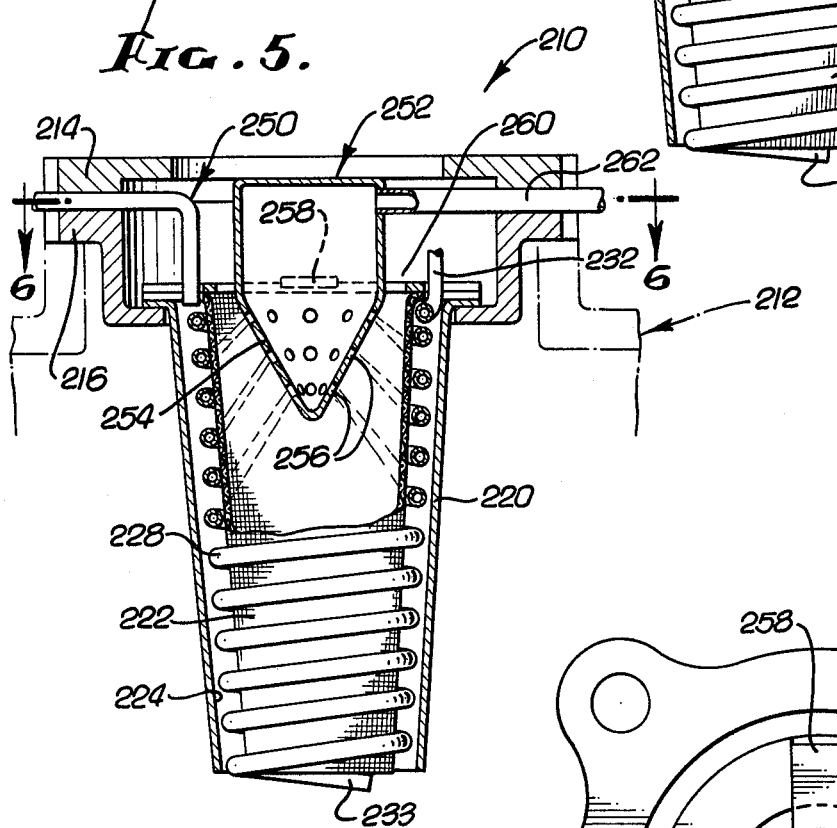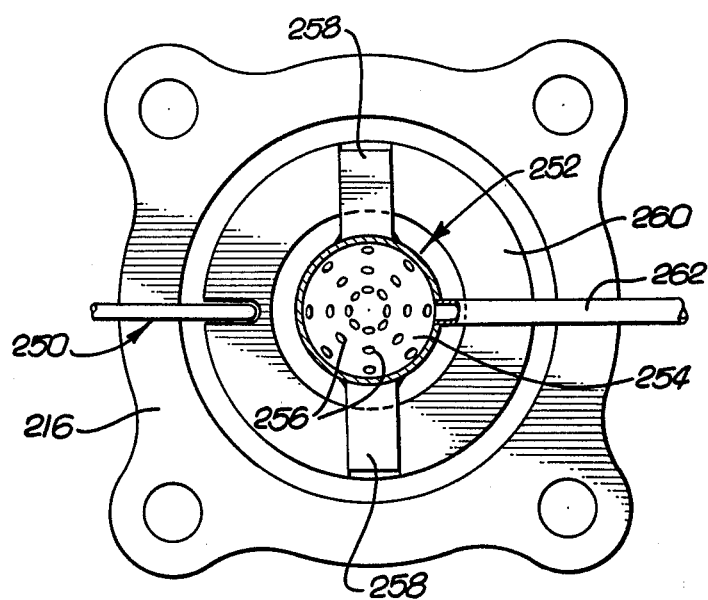

FUEL VAPORIZING DEVICE

BACKGROUND OF INVENTION

The present application is a continuation-in-part of my co-pending application Ser. No. 683,325, filed July 19, 1976, on Emission Control Device, now abandoned.

The present invention relates in general to a device for vaporizing the fuel delivered to the cylinders of an internal combustion engine through its intake manifold.

More particularly, the invention contemplates a fuel vaporizing device installed below the carburetor of the engine and extending into the intake manifold. The device thus vaporizes the fuel prior to delivery of the fuel-air mixture to the cylinders through the intake manifold.

OBJECTS AND SUMMARY OF INVENTION

The primary object of the invention is to provide a device which so completely vaporizes the fuel as to minimize the emission of such combustible air pollutants as hydrocarbons, carbon monoxide, and the like.

More particularly, the invention may be summarized as including, and an important object is to provide a fuel vaporizing device which includes: a heat conducting tubular housing having inlet and outlet ends; a heat conducting screen within and coaxial with the housing, there being an annular space between the housing and the screen; a heat conducting helical coil within the annular space and coaxial with the housing and the screen; and means for heating the helical coil to maximize vaporization of the fuel passing through the device.

An important feature of the foregoing construction is that the helical coil induces spinning of the fuel-air mixture flowing axially through the annulus between the housing and the screen. Such spinning of the mixture results in even more intimate mixing of the fuel and air therein.

Another important object is to provide diffuser means within and coaxial with the screen adjacent the inlet end of the housing, and having openings therein through which the mixture of fuel and air may flow, for directing the mixture outwardly through the screen into the annulus containing the helical coil, and into contact with the helical coil and the housing. Flow of the mixture through the screen further vaporizes the fuel in the mixture before it reaches the coil, thereby enhancing the vaporizing effect of the heated coil.

A further important object is to provide a device having fuel injecting means within and coaxial with the screen adjacent the inlet end of the housing, for spraying fuel toward the outlet end of the housing and outwardly against and through the screen into the coil-containing annulas between the screen and the housing. With this construction, the fuel is not introduced into the carburetor, but is introduced directly into the vaporizing device of the invention.

An additional object is to provide a construction wherein the helical coil is a double helix and wherein the means for heating the helical coil is electrical.

Yet another object is to provide a construction wherein the helical coil is in contact with the screen and is spaced radially inwardly from the housing so that the fuel and air can flow helically through the annulus even with a double helix, i.e., a helix doubled back on itself.

Yet another object is to provide a helical coil which is a single helix and tubular, and wherein the means for heating the helical coil includes means for delivering heated air thereto adjacent the inlet end of the housing.

Still another object is to provide a fuel vaporizing device which includes a de-icer tube communicating with the inlet end of the housing for delivering heated air thereto during icing conditions.

A still further object is to provide a construction wherein the helical coil is bonded to the screen so that the helical coil and the screen structurally reinforce each other.

The foregoing objects, advantages, features and results of the present invention, together with various other objects, advantages, features and results which will be evident to those skilled in the fuel vaporizing art in the light of this disclosure, may be achieved with the exemplary embodiments of the invention illustrated in the accompanying drawings and described in detail hereinafter.

DESCRIPTION OF DRAWINGS

FIG. 4 is a view similar to FIG. 1, but illustrating another embodiment of the invention;

FIG. 5 is a view also similar to FIG. 1, but illustrating still another embodiment of the invention; and FIG. 6 is a view taken as indicated by the arrowed line 6—6 of FIG. 5 of the drawings.

Figure 1:
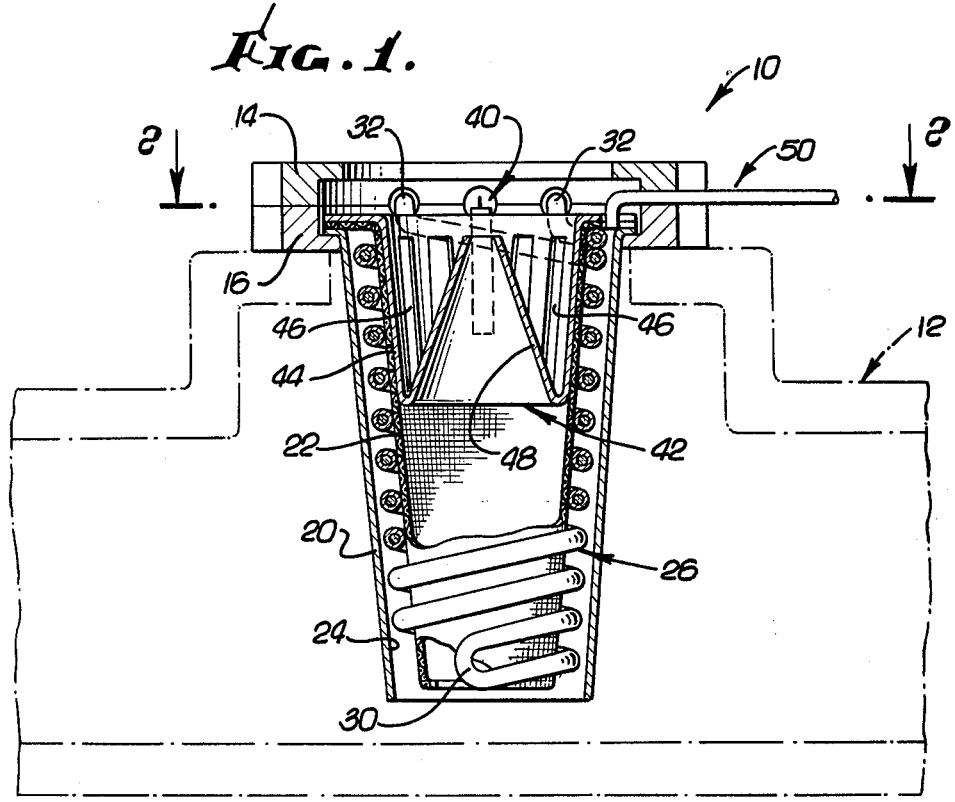
FIG. 1 is a longitudinal sectional view, partially in elevation, showing a fuel vaporizing device of the invention installed in an intake manifold of an internal combustion engine below a carburetor of the invention, the carburetor being omitted for convenience, and the intake manifold being fragmentarily shown in phantom.
Figure 2:
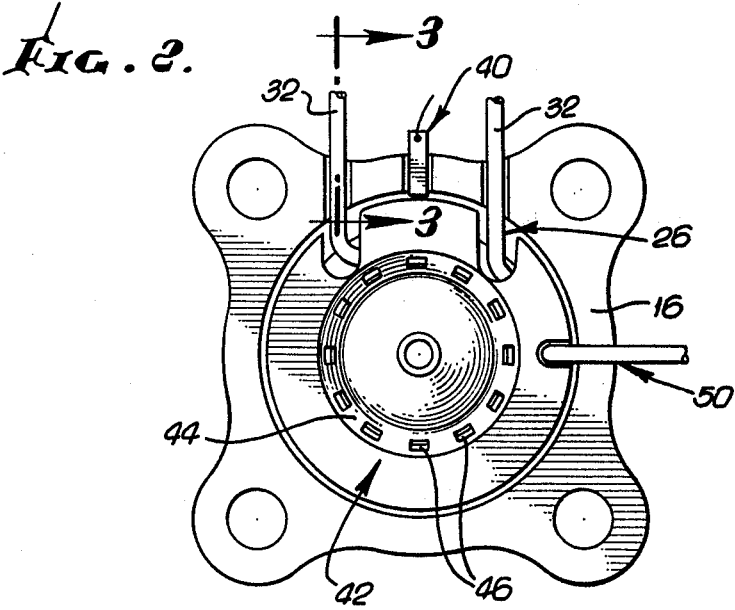
FIG. 2 is a view taken as indicated by the arrowed line 2—2 of FIG. 1.
Figure 3:
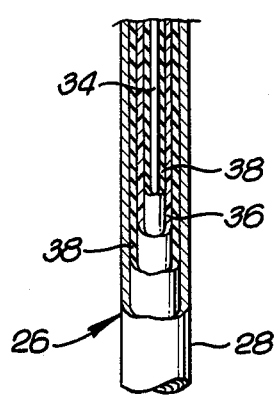
FIG. 3 is an enlarged, fragmentary sectional view taken as indicated by the arrowed line 3—3 of FIG. 2.

DESCRIPTION OF EXEMPLARY EMBODIMENT, FIGS. 1 to 3

Referring to FIGS. 1 to 3, the fuel vaporizing device of the invention is designated generally therein by the numeral 10 and fits between the carburetor, not shown, and the intake manifold 12 of an internal combustion engine, not shown, with the device extending into the intake manifold. In the particular embodiment illustrated, the fuel vaporizing device 10 extends downwardly from the carburetor into the intake manifold 12. It will be understood that the particular configuration and orientation of the fuel vaporizing device 10 will depend on the particular engine with which it is used, and that the number of devices will depend on the number of carburetor barrels.

Considering the device 10 in more detail, it is shown as including two mounting plates 14 and 16 adapted to be clamped between the carburetor and the intake manifold 12. The lower mounting plate 16 supports the flanged upper, inlet end of a heat conducting, preferably metallic, tubular housing 20 having an open lower, outlet end. A heat conducting, preferably metallic, tubular screen 22 is disposed within and coaxial with the housing 20 and is supported by an externally flanged upper end resting on the externally flanged upper end of the housing. There is an annular space 24 between the housing 20 and the screen 22.

A heat conducting helical coil 26 is disposed within the annular space 24 in coaxial relation therewith. The helical coil 26 includes an outer tube 28 which is preferably copper, aluminum, or the like, and which is preferably bonded to the screen 22 and spaced inwardly from the housing 20. The helical coil 26 is a double helix, being doubled back on itself at 30 and having upper ends 32 which extend outwardly between the mounting plates 14 and 16. The helical coil 26 constitutes an electrical heating means and contains an electrical conductor 34, FIG. 3, the ends of which are connected into the electrical circuit associated with the engine with which the device is used to provide a source of electrical power. The conductor 34 may be separated from the helical coil 26 by a Teflon tube 36 with tubes of flexible electrical insulating cement 38 between the wire 34 and the tube 36 and between the tube 36 and the tube 28. The circuit for electrically heating the helical coil 26, by heating the resistance wire 34, may include a thermostat 40 responsive to the temperature in the annular space 24.

Within the upper or inlet end of and coaxial with the screen 22 is a diffuser or diffuser means 42 supported by an external annular flange seated on the external annular flange of the screen. The diffuser 42, preferably metallic, includes an outer wall 44 which is seated against the screen 22 and which is provided with a plurality of circumferentially spaced openings 46 therein. The lower end of the outer wall 44 terminates in an upwardly extending, upwardly convergent, frusto-conical inner wall 48 having a small open upper end and a large open lower end.

Considering the operation of the fuel vaporizing device 10 of the invention as thus far described, the fuel-air mixture from the carburetor, not shown, above the device 10 is for the most part deflected outwardly by the diffuser 42, and through the screen 22 into the annulus 24 between the screen and the housing 20. The effect of the diffuser 42 is to distribute the mixture over the helical coil 26, while the screen 22 produces a fine mist from any fuel droplets in the mixture, before such droplets reach the coil. The latter heats the fuel-air mixture and, further, because of its helical configuration, imposes a spiral motion on the mixture as it flows downwardly through the annulus 24. This spiral or spinning motion results in even more thorough mixing of the fuel and the air and maximum vaporization of the fuel. Because of the fact that the coil 26 is a double helix, being doubled back at 30, the clearance shown between the coil and the housing 20 is preferable to avoid a dead end between the convolutions of the coil at the end 30.

Because of the foregoing interactions of the housing 20, the screen 22, the helical coil 26 and the diffuser 42, maximum vaporization of the fuel in the fuel-air mixture is obtained. The end effect is to minimize the emission of air pollutants by attaining more complete combustion of hydrocarbons, carbon monoxide, and the like, which is an essential feature of the invention.

The fuel vaporizing device 10 preferably includes a de-icer tube 50 which can be used during icing conditions to deliver heated air from a suitable source, not shown, to the inlet end of the housing 20 for mixing with the fuel-air mixture passing through the device. In the particular construction illustrated, the de-icer tube 50 is shown as discharging into the upper end of the annulus 24, but it can, if desired, discharge into the diffuser 42, for example.

EXEMPLARY EMBODIMENT OF INVENTION, FIG. 4

In FIG. 4 of the drawings is shown a fuel vaporizing device 110 which is similar to most respects to the device 10 of FIGS. 1 to 3. For convenience, parts of the device 110 which correspond to parts of the device 10 are identified by reference numerals higher by 100.

The fuel vaporizing device 110 differs from the device 10 in utilizing heated air, instead of an electrical heating means, to heat the fuel-air mixture as it spirals downwardly through the annular space 124. More particularly, the annular space 124 contains a helical metallic tube 128 which is bonded to the screen 122 and which is a single helix having an upper end 132 connected to a suitable source, not shown, of heated air. The lower end 133 of the coiled tube 128 discharges at the lower end of the annular 124.

The fuel vaporizing device 110 operates in essentially the same manner as the device 10, the only difference being in the source of heat for the helical coil 128.

EXEMPLARY EMBODIMENT OF INVENTION, FIGS. 5 AND 6

Shown in FIGS. 5 and 6 of the drawings is a fuel vaporizing device 210 which is similar to the device 110, reference numerals higher by 100 being utilized for corresponding parts.

The fueld vaporizing device 210 is intended for use with a "carburetor", not shown, which controls air flow only, and which does not introduce fuel into the flow of air therethrough. Instead, the diffuser 142 of the device 10 is omitted and, in its place, a fuel injecting means 252 is installed within the upper end of the screen 222. The fuel injecting means 252 comprises a hollow body 254 provided with a downwardly tapered portion within the screen 222, such downwardly tapered portion having openings 256 for directing jets of fuel outwardly and downwardly against the screen 222. The latter tends to break the fuel jets up into a mist which is mixed with the air in, and heated in, the annular space 224. In all other respects, the device 210 operates in a manner similar to the device 110.

The body 254 is carried by arms 258 connected to an annulus 260 seated on the flanged screen 222. Fuel is supplied through a line 262.

Although exemplary embodiments of the invention have been disclosed for illustrative purposes, it will be understood that various changes, modifications and substitutions may be incorporated in such embodiments without departing from the invention as hereinafter claimed.

I claim as my invention:

1. In a fuel vaporizing device for installation between a carburetor and an intake manifold of an internal combustion engine with the device extending into the intake manifold, the combination of:
    (a) a heat conducting tubular housing having an open, upper inlet end and an open, lower outlet end;
    (b) means for mounting said housing between the carburetor and the intake manifold of the engine with the housing extending downwardly into the intake manifold;
    (c) a heat conducting screen within and coaxial with and substantially parallel to said housing, there being an annular space between said housing and said screen;
    (d) a heat conducting helical coil within said annular space and coaxial with said housing and said screen, said helical coil being in contact with said screen and spaced radially inwardly from said housing; and
    (e) means for heating said helical coil.

2. A fuel vaporizing device as defined in claim 1 wherein said helical coil is in contact with said screen and is spaced radially inwardly from said housing.

3. A fuel vaporizing device as set forth in claim 1 including fuel injecting means within and coaxial with said screen adjacent said inlet end of said housing, for spraying fuel toward said outlet end of said housing and outwardly against said screen.

4. A fuel vaporizing device as defined in claim 1 wherein said housing, said screen and said helical coil are all metallic.

5. A fuel vaporizing device according to claim 1 including a de-icer tube communicating with said inlet end of said housing for delivering heated air thereto.

6. A fuel vaporizing device as set forth in claim 1 wherein said helical coil is a double helix and wherein said means for heating said helical coil is electrical.

7. A fuel vaporizing device as defined in claim 1 wherein said helical coil is a single helix and tubular, and wherein said means for heating said helical coil includes means for delivering heated air thereto adjacent said inlet end of said housing.

8. In a fuel vaporizing device for an internal combustion engine, the combination of:
   (a) a heat conducting tubular housing having inlet and outlet ends;
   (b) a heat conducting screen within and coaxial with and substantially parallel to said housing, there being an annular space between said housing and said screen, said screen being perforated over at least a major portion of its surface;
   (c) a heat conducting helical coil within said annular space and coaxial with said housing and said screen;
   (d) means for heating said helical coil; and
   (e) diffuser means within and coaxial with said screen adjacent said inlet end of said housing, and having openings therein through which a mixture of fuel and air may flow, for directing the mixture outwardly into contact with said screen, said helical coil and said housing.

* * * * *